UNITED STATES PATENT OFFICE.

CONSTANTIN FAHLBERG, OF NEW YORK, N. Y.

SACCHARINE COMPOUND.

SPECIFICATION forming part of Letters Patent No. 326,281, dated September 15, 1885.

Application filed June 26, 1885. (No specimens.)

*To all whom it may concern:*

Be it known that I, CONSTANTIN FAHLBERG, of the city, county, and State of New York, have invented certain new and useful Improvements in Saccharine Compounds, of which the following is a specification.

This invention relates to an improved saccharine compound, in the production of which the saccharine compound is employed that has been patented to me under date of June 2, 1885, No. 319,082, and to which the chemical name of "benzoic sulfinide" has been given; and the invention consists of a saccharine compound composed of a mixture of grape or starch sugar and benzoic sulfinide, to which I have given the name of "dextro-saccharine."

My invention has for its object to bring a proportionately large quantity of grape or starch sugar together with a proportionately small quantity of benzoic sulfinide, whereby the latter imparts to the whole mass about the sweetening property of cane sugar or saccharose, so as to be successfully used in the preparation of candies, preserves, cordials, &c.

In carrying out my invention the liquors resulting from the conversion of starch into grape or starch sugar, commonly known as "glucose," are mixed either in the vacuum-pan or previous to the evaporation therein in the proportion of from one to two pounds (more or less) of benzoic sulfinide to one ton of anhydrous sugar in solution until the mass becomes clear and homogeneous. The liquor is then evaporated down to any desired consistency and run either into molds and allowed to solidify, so as to form solid dextro-saccharine, or it is kept in a liquid state, so as to form liquid dextro-saccharine, or crystallized by the "Behr" process as anhydrous dextro-saccharine. All of these products possess the combined properties of grape or starch sugar and benzoic sulfinide, and may be used as substitutes for cane-sugar, as, notwithstanding the comparatively high price of benzoic sulfinide, dextro-saccharine can be furnished at a lower price than cane-sugar, owing to the low price of grape-sugar and the small quantity of benzoic sulfinide required for imparting to the same the sweetness of cane-sugar or saccharose.

Having thus described my invention, I claim as new and desire to secure by Letters Patent—

A saccharine compound consisting of a mixture of starch or grape sugar and benzoic sulfinide, substantially as and for the purpose set forth.

In testimony that I claim the foregoing as my invention I have signed my name in presence of two subscribing witnesses.

CONSTANTIN FAHLBERG.

Witnesses:
 PAUL GOEPEL,
 SIDNEY MANN.